(12) United States Patent
Xu et al.

(10) Patent No.: US 10,257,913 B2
(45) Date of Patent: Apr. 9, 2019

(54) LIGHTING CONTROL METHOD, LIGHTING APPARATUS, AND SYSTEM

(71) Applicant: ZHEJIANG SHENGHUI LIGHTING CO., LTD, Jiaxing (CN)

(72) Inventors: Yi Xu, Jiaxing (CN); Xiaoping Zhu, Jiaxing (CN); Chaoqun Sun, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 0 days.

(21) Appl. No.: 15/543,982

(22) PCT Filed: Apr. 8, 2016

(86) PCT No.: PCT/CN2016/078865
§ 371 (c)(1),
(2) Date: Jul. 15, 2017

(87) PCT Pub. No.: WO2016/169415
PCT Pub. Date: Oct. 27, 2016

(65) Prior Publication Data
US 2017/0374725 A1      Dec. 28, 2017

(30) Foreign Application Priority Data
Apr. 20, 2015   (CN) .......................... 2015 1 0187759

(51) Int. Cl.
*H05B 37/02*      (2006.01)
*H05B 33/08*      (2006.01)
(Continued)

(52) U.S. Cl.
CPC .......... *H05B 37/0272* (2013.01); *H04W 4/80* (2018.02); *H05B 33/0845* (2013.01);
(Continued)

(58) Field of Classification Search
CPC ............ H05B 37/0218; H05B 37/0227; H05B 37/0245; H05B 37/0254; H05B 37/0272; H05B 37/0281; H05B 37/029
(Continued)

(56) References Cited

U.S. PATENT DOCUMENTS

| 2013/0234607 A1* | 9/2013 | Kim ................... H05B 33/0854 315/158 |
| 2014/0159585 A1* | 6/2014 | Reed .................. H05B 33/0815 315/130 |

(Continued)

FOREIGN PATENT DOCUMENTS

| CN | 103313487 A | 9/2013 |
| CN | 103796381 A | 5/2014 |

(Continued)

*Primary Examiner* — Tung X Le
(74) *Attorney, Agent, or Firm* — Anova Law Group, PLLC

(57) ABSTRACT

In accordance with various embodiments of the disclosed subject matter, a lighting control method, a related lighting apparatus and system are provided. One embodiment of the present disclosure provides a lighting control method. The method includes detecting a connection status of a wireless network component of a lighting apparatus and controlling a working status of an illumination component of the lighting apparatus based on the connection status.

17 Claims, 10 Drawing Sheets

(51) Int. Cl.
*H04W 4/80* (2018.01)
*H04W 12/06* (2009.01)

(52) U.S. Cl.
CPC ......... *H05B 37/0281* (2013.01); *H04W 12/06* (2013.01); *H05B 37/0227* (2013.01)

(58) Field of Classification Search
USPC .................... 315/152, 158, 307, 312, 360
See application file for complete search history.

(56) References Cited

U.S. PATENT DOCUMENTS

2014/0285113 A1\* 9/2014 Huang ............... H05B 37/0272
315/297
2015/0296599 A1\* 10/2015 Recker ............... H05B 37/0272
315/153

FOREIGN PATENT DOCUMENTS

| CN | 104053269 A | 9/2014 |
| CN | 104125687 A | 10/2014 |
| CN | 104582176 A | 4/2015 |
| CN | 104869699 A | 8/2015 |
| CN | 204810593 U | 11/2015 |

\* cited by examiner

LIGHTING CONTROL METHOD, LIGHTING APPARATUS, AND SYSTEM

CROSS-REFERENCES TO RELATED APPLICATIONS

This application is a national phase entry under 35 U.S.C. § 371 of International Application No. PCT/CN2016/078865, filed on Apr. 8, 2016, which claims priority to Chinese Patent Application No. 201510187759.X, filed on Apr. 20, 2015. The above enumerated patent applications are incorporated by reference herein in their entirety.

TECHNICAL FIELD

The disclosed subject matter generally relates to the field of lighting technology and, more particularly, relates to a lighting control method, related lighting apparatus and systems.

BACKGROUND

Currently, controlling the lighting of a lighting system in an office environment or a home environment is mainly realized by using switches corresponding to multiple lighting devices of the lighting system. In order to save energy, a voice-based lighting control system can be used to control a lighting system. However, the existing voice-based lighting control system has many limitations.

For example, in a noisy place, even if there is no user still in the place, a voice-based lighting control system may still turn on the lighting devices due to the environment noises. In another example, in a very quiet workplace, even if a user is still in the workplace, a voice-based lighting control system may turn off the lighting devices due to no sound detection. In yet another example, in order to activate a light device, a user usually needs to make special sounds, which is inconvenient and may also disturb the surrounding environment. Accordingly, the existing voice-based lighting control method still cannot achieve a reliable and convenient lighting control function.

Accordingly, it is desire to provide a lighting control method, a related lighting apparatus and system.

BRIEF SUMMARY

In accordance with some embodiments of the disclosed subject matter, a lighting control method, a related lighting apparatus and system.

One aspect of the present disclosure provides a lighting control method. The method includes detecting a connection status of a wireless network component of a lighting apparatus; and controlling a working status of an illumination component of the lighting apparatus based on the connection status.

Optionally, the method includes if the connection status indicates that at least one terminal is currently connected with the wireless network component, turning on the illumination component.

Optionally, the method includes if the connection status indicates that at least one terminal is currently connected to the wireless network component, switching the illumination component into a bright mode.

Optionally, the method includes if the connection status indicates that no terminal is currently connected to the wireless network component, turning off the illumination component.

Optionally, the method includes if the connection status indicates that no terminal is currently connected with the wireless network component, switching the illumination component into a dim mode.

Optionally, the method includes turning off the illumination component comprises turning off the illumination component after a delay period.

Optionally, the method includes switching the illumination component into a dim mode comprises switching the illumination component into a dim mode after a delay period.

Optionally, the method includes in response to receiving a connection request from a terminal, implementing a terminal authentication of the terminal; and if the terminal authentication is successful, allowing the terminal to connect to the wireless network component, otherwise refusing the terminal to connect to the wireless network component.

Optionally, the method includes configuring authentication information for the lighting apparatus before implementing the terminal authentication. The connection request comprises authentication request information. The method further includes determining whether the authentication request information is consistent with the authentication information; and if the authentication request information is consistent with the authentication information, determining that the terminal authentication is successful, otherwise, determining that the terminal authentication has failed.

Another aspect of the present disclosure provides a lighting apparatus. The lighting apparatus includes a control component and a wireless network component. The wireless network component includes a wireless communication device configured for providing a wireless network signal to a terminal, and a first signal transmission device configured for transmitting a connection status of the wireless network component to the control component. The lighting apparatus further includes an illumination component. The control component is configured for monitoring the connection status of the wireless network component in real time or periodically, and for controlling a working status of the illumination component based on the connection status of the wireless network component.

Optionally, the control component is further configured for sending a turn-on instruction to the illumination component in response to determining that the wireless network component is currently connected to at least one terminal.

Optionally, the control component is further configured for sending a turn-off instruction to the illumination component in response to determining that there is no terminal connected to the wireless network component.

Optionally, a timer is connected to the control component, wherein the timer is configured for timekeeping a delay period. The control component is further configured for starting the timer in response to determining that there is no terminal connected to the wireless network component, and sending the turn-off instruction to the illumination component in response to receiving an indication from the timer indicating that the delay period has passed.

Optionally, the lighting apparatus further includes a receiver. The receiver includes a receiver device configured for receiving a connection request from a terminal, and a second signal transmission device configured for transmitting the connection request to the control component.

Optionally, the control component is further configured for: in response to receiving the connection request from the receiver, implementing a terminal authentication of the terminal; if the terminal authentication is successful, allowing the terminal to connect to the wireless network component, otherwise refusing the terminal to connect to the wireless network component.

Optionally, the lighting apparatus further includes a memory component connected with the control component for storage authentication information configured for the lighting apparatus. The connection request comprises authentication request information of the terminal. The control component is further configured for determining whether the authentication request information is consistent with the authentication information, if the authentication request information is consistent with the authentication information, determining that the terminal authentication is successful, otherwise, determining that the terminal authentication has failed.

Optionally, the wireless network component comprises a Wi-Fi equipment; and the illumination component comprises a LED device.

Another aspect of the present disclosure provides a lighting system, comprising a plurality of lighting apparatuses described above.

Optionally, the plurality of lighting apparatuses have a same identifier; and the plurality of lighting apparatuses form one of a mesh structure network, a tree structure network, or a star structure network.

Optionally, each lighting apparatus comprises a transmitter configured for transmitting control instructions from the control component to the terminal. The transmitter is connected to the control component; and the control instructions is used for instructing the terminal to connect to one of the plurality of lighting apparatuses that has a strongest wireless network signal strength.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

It should be noted that, a term "terminal" used hereinafter refers to a mobile electronic device, including, but not limited to any suitable electronic product that has a human-computer interaction function through a keyboard, a touchpad, or a sound equipment. For example, a terminal can be a cell phone, a smart phone, a Personal Digital Assistant (PAD), a notebook computer, a tablet computer, a smart watch, a vehicle computer, etc.

In accordance with various embodiments, the disclosed subject matter provides a lighting control method, a related lighting apparatus and system.

Figure 1A:
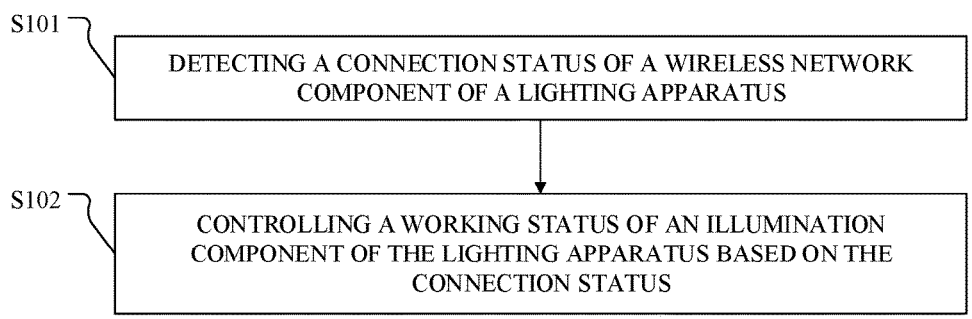
FIGS. 1A-1E are flowcharts of various exemplary lighting control methods in accordance with some embodiments of the disclosed subject matter.

Referring to FIG. 1A, a flow diagram of an exemplary lighting control method is shown in accordance with some embodiments of the disclosed subject matter. The lighting control method is implemented by a lighting apparatus in some embodiments shown in FIG. 1A. The lighting control method can include the following steps.

Step 101: detecting a connection status of a wireless network component of the lighting apparatus;

Step 102: controlling a working status of an illumination component of the lighting apparatus based on the connection status.

In some embodiments, a lighting apparatus that implements the disclosed method can include a wireless network component and an illumination component. The wireless network component includes equipment that can provide a wireless network signal, such as a Wi-Fi device. The illumination component includes equipment that has an illumination function, such as a light-emitting diode (LED).

Specifically, the lighting apparatus can monitor the connection status of the wireless network component in real time or periodically. The connection status refers to whether a wireless network signal provided by the wireless network component is connected to a terminal. For example, the connection status may include a connected state and an unconnected state. A connected state may indicate that the wireless network signal is connected to a single terminal, may also indicate that the wireless network signal is connected to multiple terminals simultaneously. That is, as long as there is at least one terminal that is connected to the wireless network component, the wireless network component is in a connected state. Contrarily, if no terminal is connected to the wireless network component, the wireless network component is in an unconnected state.

Specifically, based on the connection status of the wireless network component, in some embodiments, there are two cases for controlling the working status of the illumination component of the lighting apparatus. In the first case, if a current connection status indicates that the wireless network component is connected with at least one terminal, it means that there is at least one user within a coverage area of the lighting apparatus. In the second case, if the current connection status indicates that there is no terminal connected with the wireless network component, it means that there is no user within the coverage area of the lighting apparatus.

Figure 1B:
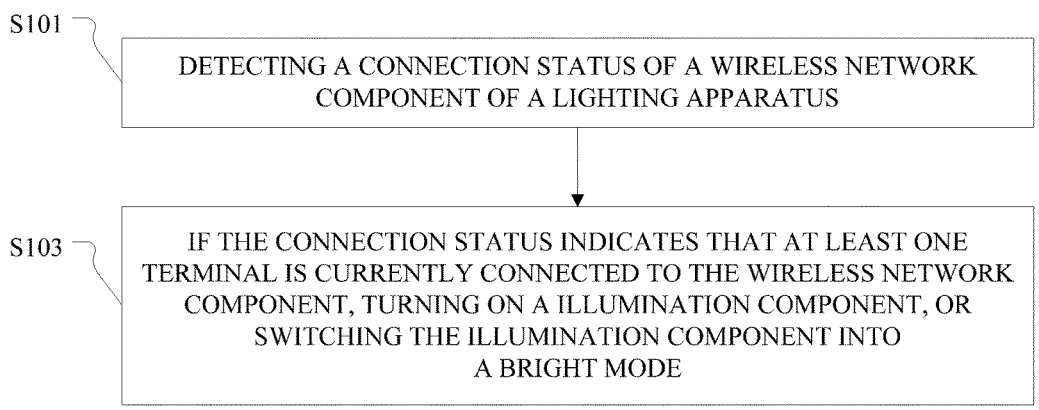

Referring to FIG. 1B, a flow diagram of another exemplary lighting control method based on the above-described first case is shown in accordance with some embodiments of the disclosed subject matter. When there is at least one user within a coverage area of the lighting apparatus, the Step 102 described above in connection with FIG. 1A may specifically include the following Step 103.

Step 103, if the connection status indicates that at least one terminal is currently connected with the wireless network component, turning on the illumination component, or turning the illumination component into a bright mode.

Specifically, if at least one user is detected within a coverage area of the lighting apparatus, the lighting apparatus can provide a lighting function. In some embodiments, a specific lighting brightness can be set according to specific requirements.

The bright mode means that the illumination component is turned on and a brightness of the illumination component is above a certain threshold value. Based on different implementation environments, different threshold values of the bright mode can be predetermined. For example, some places, such as classrooms, offices, etc., may need a high brightness level illumination. In another example, some places, such as hotel corridors, restrooms, etc., may only require low brightness level illumination. Accordingly, in some embodiments, the illumination components can work in multiple modes to meet the different needs of the actual scenes, which can not only save the energy but also increase the flexibility of the lighting control.

Moreover, in some embodiments, the illumination component can be controlled to adjust the brightness level in any suitable ways, such as a gradual dimming or increasing of the brightness levels. For example, the illumination component can be controlled to turn on to the bright mode by gradually increase the brightness level.

Figure 1C:
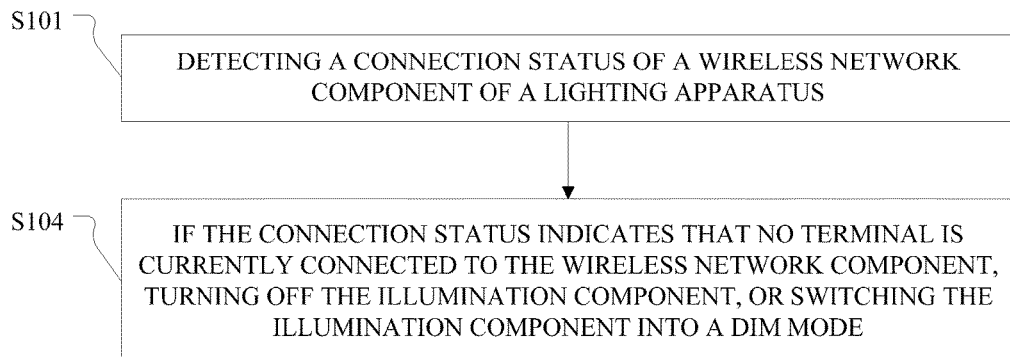

Referring to FIG. 1C, a flow diagram of another exemplary lighting control method based on the above-described second case is shown in accordance with some embodiments of the disclosed subject matter. When there is no user within the coverage area of the lighting apparatus, the Step 102 described above in connection with FIG. 1A may specifically include the following Step 104.

Step 104, if the connection status indicates that no terminal is currently connected with the wireless network component, turning off the illumination component, or turning the illumination component into a dim mode.

Specifically, if no user is detected within the coverage area of the lighting apparatus, a lighting function of the lighting apparatus can be turned off, or a lighting function of low brightness level can be provided.

The dim mode means that the illumination component is turned on and a brightness level of the illumination component is below a certain threshold value. Based on different implementation environments, different threshold values of the dim mode can be set. For example, certain places, such as a classroom, office, etc., may not need illumination when there is no user. In another example, certain places, such as roads, parks, etc., even if there are no users currently, still need to provide illumination with a lower brightness level of lighting. Accordingly, in some embodiments, the illumination component can work in multiple modes to meet the different needs of the actual scenes, which can not only save the energy but also increase the flexibility of the lighting control.

Moreover, in some embodiments, the illumination component can be controlled to adjust the brightness level in any suitable ways, such as a fade-away. For example, the illumination component can be controlled to switch to the dim mode during or after a fade-away.

Some public places may have users frequently enter and exit the places. In order to avoid frequent changing of the working status of the illumination component, timing factor can be added to the control of the working status of the illumination component of the lighting apparatus. For example, a delay period can be preset for Step 104. That is, the lighting control may turn off the illumination component after the delay period, or switch the illumination component to a dim mode after the delay period.

In some embodiments, the delay period can be set according to different requirements. Specifically, after the delay period, the controlling of the working status of the illumination component of the lighting apparatus is still based on an updated connection status of the wireless network component. For example, if the updated connection status after the delay period indicates that no terminal is currently connected to the wireless network component, then a control action of turning off the illumination component, or switching the illumination component into a dim mode can be performed. Contrarily, if the updated connection status after the delay period indicates that at least one terminal is currently connected to the wireless network component, then a control action of keeping the illumination component in an active state, or keeping the illumination component in a bright mode can be performed.

Based on the above described subject matter in connection with FIGS. 1A-1C, in one embodiment, a lighting apparatus can monitor a connection status of a wireless network component in real time. When at least one terminal is connected to the wireless network components, a turn-on instruction can be sent to an illumination component. When the last terminal disconnects from the wireless network component, a turn-off instruction can be sent to the illumination component. Upon receiving the turn-on instruction or the turning-off instruction sent by the lighting apparatus, the illumination component can perform a corresponding control action.

Both cases described above in connection with FIG. 1B and FIG. 1C respectively can not only be implemented separately in some embodiments, but also be implemented as a combined method in some embodiments.

In some embodiments, a terminal authentication may be implemented in order to prevent a non-registered terminal from connecting to and thereby controlling the lighting apparatus. For example, in a workplace, when a terminal is trying to connect to the wireless network component of the lighting apparatus, a terminal authentication can be implemented by the wireless network component to check if the terminal belongs to an employee of this workplace. In another example, in a residential house, when a terminal is trying to connect to the wireless network component of the lighting apparatus, a terminal authentication can be implemented by the wireless network component to check if the terminal belongs to a family member of this residential house. The terminal authentication can include any suitable method, such as identifier/password authentication, barcode authentication, etc.

Figure 1D:
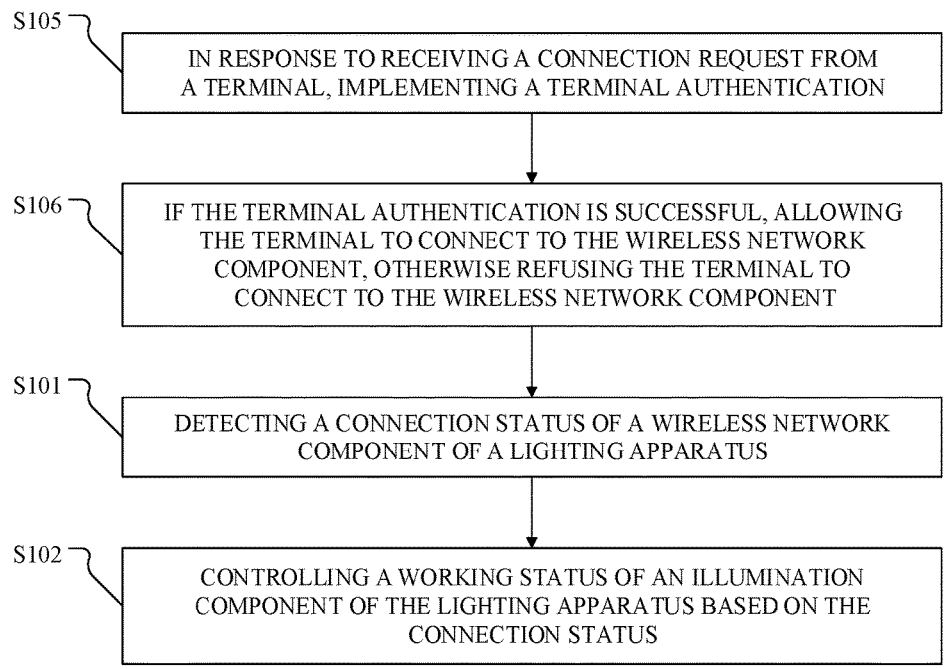

Accordingly, referring to FIG. 1D, a flow diagram of another exemplary lighting control method based on any one of the above-described methods is shown in accordance with some embodiments of the disclosed subject matter. As illustrated, the method can include the following steps.

Step 105: in response to receiving a connection request from a terminal, authenticating a terminal authentication.

Step 106: if the terminal authentication is successful, allowing the terminal to connect to the wireless network component; otherwise refusing the terminal to connect to the wireless network component.

Figure 1E:
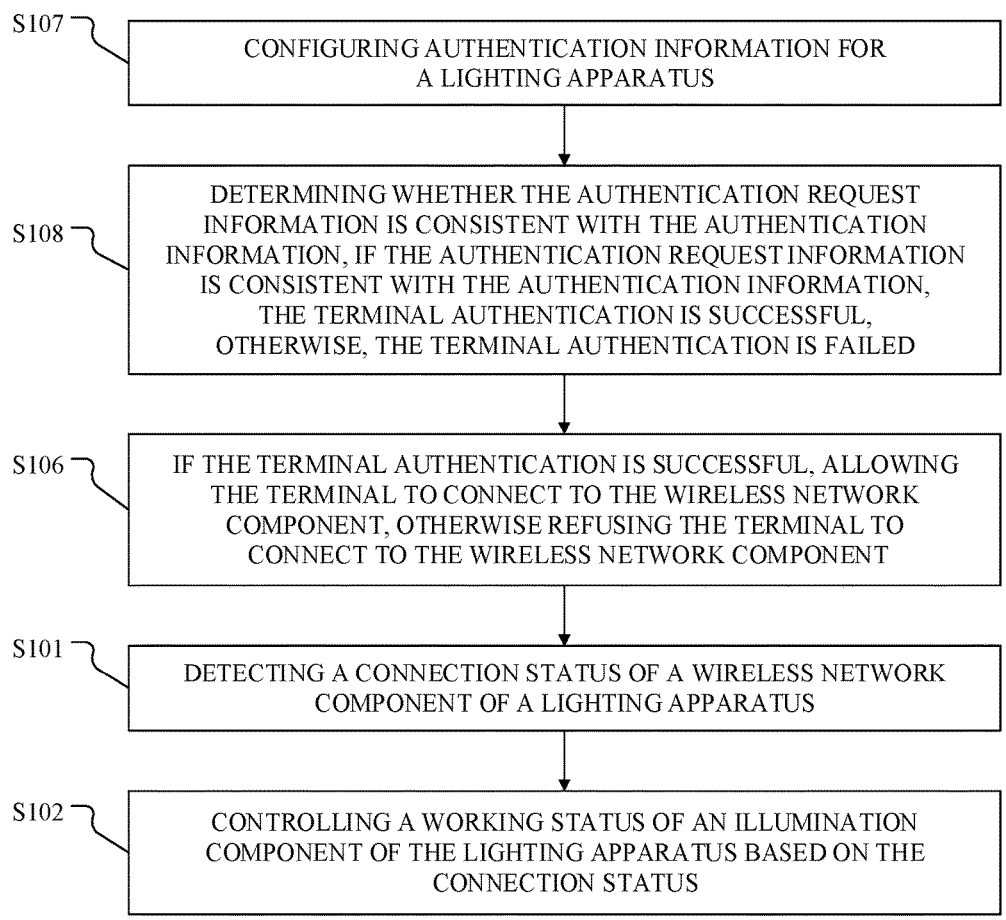

Referring to FIG. 1E, a flow chart of the lighting control method shown in FIG. 1D including an exemplary terminal authentication method is shown in accordance with some embodiments of the disclosed subject matter. Based on the method described above in connection with FIG. 1D, the connection request from a terminal can include any suitable authentication request information.

As illustrated, before performing Step 105 shown in FIG. 1D, another step 107 can be performed.

Step 107: configuring authentication information for the lighting apparatus.

Accordingly, Step 105 can include the following step 108.

Step 108: determining whether the authentication request information is consistent with the authentication information. If the authentication request information is consistent with the authentication information, the terminal is authenticated, otherwise, the terminal authentication fails.

In some embodiments, the authentication information may be determined according to different requirements. For example, the authentication information may include an identification of the lighting apparatus and a corresponding password. Specifically, a Service Set Identifier (SSID) and a password can be configured for the lighting apparatus, and also for the terminals that belong to relevant personnel in the workplace, or family members in the residential house. So that only the terminals that belong to relevant personnel in the workplace, or family members in the residential house can be connected to and then control the lighting apparatus. Therefore, the intelligence and the security of the lighting apparatus can be improved.

In some embodiments, the disclosed lighting apparatus includes a wireless network component, and can be controlled by a connection status of the wireless network component. When at least one user is detected within a coverage range of the lighting apparatus, the lighting apparatus can automatically turn on without requiring any control action from the user. Therefore, the disclosed lighting apparatus can not only provide a timely, reliable and easily implemented lighting control function, but also provide a wireless network signal for the users.

It should be noted that the above steps of the flowchart diagrams of FIGS. 1A-1E can be executed or performed in any order or sequence, not limited to the order and sequence shown and described in the figures. Also, some of the above steps of the flow diagram of FIGS. 1A-1E can be executed or performed substantially simultaneously where appropriate or in parallel to reduce latency and processing time. Furthermore, it should be noted that FIGS. 1A-1E are provided as an example only. In various embodiments, at least some of the steps shown in the figures may be performed in a different order than represented, performed concurrently, or altogether omitted.

It also should be noted that the above steps of the flowchart diagrams of FIGS. 1A-1E can be executed or performed by hardware, such as one or more hardware processors in a lighting apparatus, or by a combination of hardware and software, such as computer readable media applied on one or more hardware processors in a lighting apparatus.

In some embodiments, any suitable computer readable media can be used for storing instructions for performing the processes described herein. For example, In some embodiments, computer readable media can be transitory or non-transitory. Non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Turning to FIGS. 2A-2D, schematic structural diagram of various exemplary lighting apparatuses are shown in accordance with some embodiments of the disclosed subject matter.

Figure 2A:
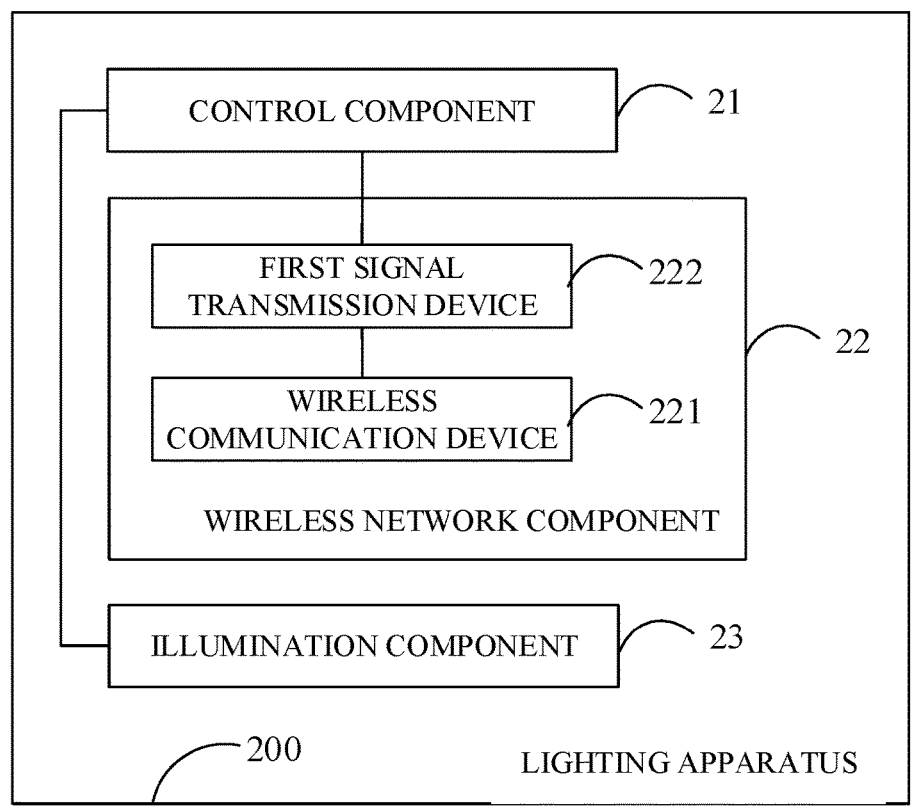
FIGS. 2A-2D are schematic structural diagrams of various exemplary lighting apparatuses in accordance with some embodiments of the disclosed subject matter.

As illustrated in FIG. 2A, an exemplary lighting apparatus 200 can include a control component 21, a wireless network component 22, and an illumination component 23.

In some embodiments, the wireless network component 22 includes: a wireless communication device 221 configured for providing a wireless network signal to a terminal, and a first signal transmission device 222 configured for transmitting a connection status of the wireless network component 22 to the control component 21.

The first signal transmission device 222 is connected with the wireless communication device 221 and the control component 21. The control component 21 is connected with the illumination component 23. The control component 21 can control a working status of the illumination component 23 based on the connection status of the wireless network component 22.

The wireless network component 22 includes an equipment that can provide a wireless network signal, such as a Wi-Fi equipment. The illumination component 23 includes an equipment that has an illumination function, such as a light-emitting diode (LED).

The wireless communication device 221 includes a device capable of providing a wireless network signal, such as Wi-Fi equipment. The illumination means 23 includes a device with lighting function, for example, LED devices.

Specifically, the control component 21 can monitor the connection status of the wireless network component 22 in real time or periodically. The connection status refers to whether a wireless network signal provided by the wireless network component 22 is connected to a terminal. For example, the connection status may include a connected state and an unconnected state. A connected state may indicate that the wireless network signal is connected to a single terminal, may also indicate that the wireless network signal is connected to multiple terminals simultaneously. That is, as long as there is at least one terminal that is connected to the wireless network component 22, the wireless network component 22 is in a connected state. Contrarily, if no terminal is connected to the wireless network component 22, the wireless network component 22 is in an unconnected state.

Further, the control component 21 can interact with a signal transmission device for transmitting control signals to the illumination component 23 to control the illumination component 23.

Specifically, based on the connection status of the wireless network component 22, there are two cases for controlling the working status of the illumination component 23 of the lighting apparatus 200. In the first case, if a current connection status indicates that the wireless network component 22 is connected with at least one terminal, it means that there is at least one user within a coverage area of the lighting apparatus 200. In the second case, if the a current connection status indicates that there is no terminal connected with the wireless network component 22, it means that there is no user within the coverage area of the lighting apparatus 200.

Based on the above-described first case, when there is at least one user within a coverage area of the lighting apparatus 200, upon determining the connection status that indicates there is at least one terminal being currently connected with the wireless network component 22, the control component 21 can send a control signal to turn on the illumination component 23, or send a control signal to turn the illumination component 23 into a bright mode.

Specifically, if at least one user is detected within a coverage area of the lighting apparatus 200, the illumination component 23 can provide a lighting function. In some embodiments, a specific lighting brightness can be set according to specific requirements.

The bright mode means that the illumination component is turned on and a brightness level of the illumination component is above a certain threshold value. Based on different implementation environments, different threshold value of the bright mode can be set. For example, some places, such as classrooms, offices, etc., may need a high brightness level illumination. In another example, some places, such as hotel corridors, toilets, etc., may only require low brightness level illumination. Accordingly, in some embodiments, the illumination component 23 can work in multiple modes to meet the different needs of the actual scenes, which can not only save the energy but also increase the flexibility of the lighting control.

Moreover, in some embodiments, the control component 21 can control the illumination component 23 to adjust the brightness level in many suitable ways, such as a fade-away. For example, the control component 21 can control the illumination component 23 to turn on to the bright mode in a fade-away.

Based on the above-described second case, when there is no user within the coverage area of the lighting apparatus 200, upon determining the connection status that indicates there is no terminal being currently connected with the wireless network component 22, the control component 21 can send a control signal to turn off the illumination component 23, or send a control signal to switch the illumination component 23 to a dim mode.

Specifically, if no user is detected within the coverage area of the lighting apparatus 200, a lighting function of the illumination component 23 can be turned off, or a lighting function of a low brightness level can be provided.

The dim mode means that the illumination component 23 is turned on and a brightness level of the illumination component 23 is below a certain threshold value. Based on different implementation environments, different threshold value of the dim mode can be predetermined. For example, some places, such as a classroom, an office, etc., may not need illumination when there is no user. In another example, some places, such as roads, parks, etc., still need to provide illumination with a lower brightness level lighting even if there is no users currently. Accordingly, in some embodiments, the illumination component 23 can work in multiple modes to meet the different needs of the actual scenes, which can not only save the energy but also increase the flexibility of the lighting control.

Moreover, in some embodiments, the control component 21 can control the illumination component 23 to adjust the brightness level in many suitable ways, such as a fade-away. For example, the control component 21 can control the illumination component 23 to switch to the dim mode in a fade-away.

Figure 2B:
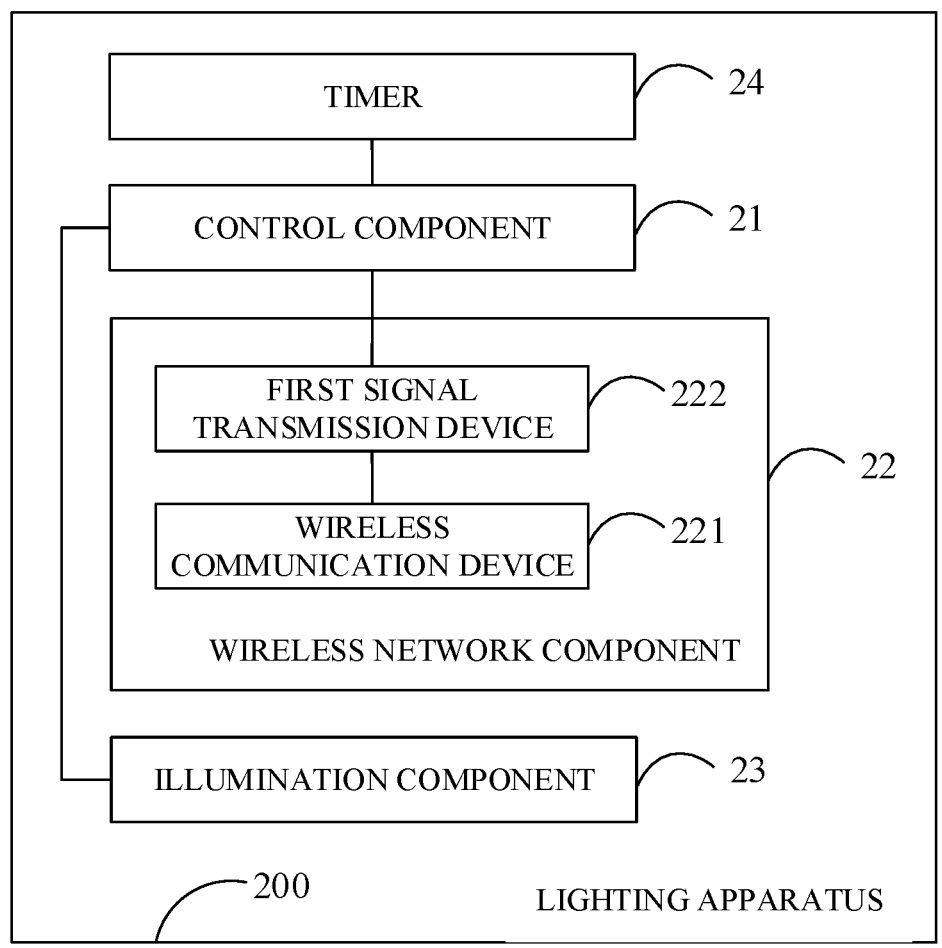

Referring to FIG. 2B, schematic structural diagram of another exemplary lighting apparatus is shown in accordance with some embodiments of the disclosed subject matter. As illustrated, the lighting apparatus 200 can further include a timer 24 connected with the control component 21.

In practice, some public places may have frequent accesses by the users. In order to avoid frequent changing of the working status of the illumination component, timing factor can be optionally involved into the control of the working status of the illumination component of the lighting apparatus. Therefore, a delay period can be preset in the timer 24. Upon determining the connection status that indicates there is no terminal being currently connected with the wireless network component 22, the control component 21 can start the timer 24. When the timer 24 returns am indication that a delay period has expired, the control component 21 can then send a control signal to turn off the illumination component 23, or send a control signal to switch the illumination component 23 to a dim mode.

In some embodiments, the delay period can be predetermined according to different requirements. Specifically, after the delay period, the control component 21 can control of the working status of the illumination component 23 of the lighting apparatus 200 based on an updated connection status of the wireless network component 22. For example, if the updated connection status after the delay period indicates that no terminal is currently connected with the wireless network component 22, then the control component 21 can send a control signal to turn off the illumination component 23, or send a control signal to switch the illumination component 23 into a dim mode. Contrarily, if the updated connection status after the delay period indicates that at least one terminal is currently connected with the wireless network component 22, then the control component 21 can keep the illumination component 23 in an active state, or keep the illumination component 23 in a bright mode.

In some embodiments, the control component 21 of the lighting apparatus 200 can monitor a connection status of the wireless network component 22 in real time. When at least one terminal is connected to the wireless network components 22, the control component 21 can send a turn-on instruction to illumination component 23. When the last terminal disconnects from the wireless network component 22, the control component 21 can send a turn-off instruction to the illumination component 23. Upon receiving the turn-on instruction or the turning-off instruction sent by the control component 21, the illumination component 23 can perform a corresponding control action.

In some embodiments, a terminal authentication may be implemented in order to prevent a non-registered terminal to connect to and thereby control the lighting apparatus 200. For example, in a workplace, when a terminal is trying to connect to the wireless network component 22 of the lighting apparatus 200, a terminal authentication can be implemented by the wireless network component 22 to check if the terminal belongs to an employee of this workplace. In another example, in a residential house, when a terminal is trying to connect to the wireless network component 22 of the lighting apparatus 200, a terminal authentication can be implemented by the wireless network component 22 to check if the terminal belongs to a family member of this residential house. The terminal authentication can include any suitable method, such as identifier/password authentication, barcode authentication, etc.

Figure 2C:
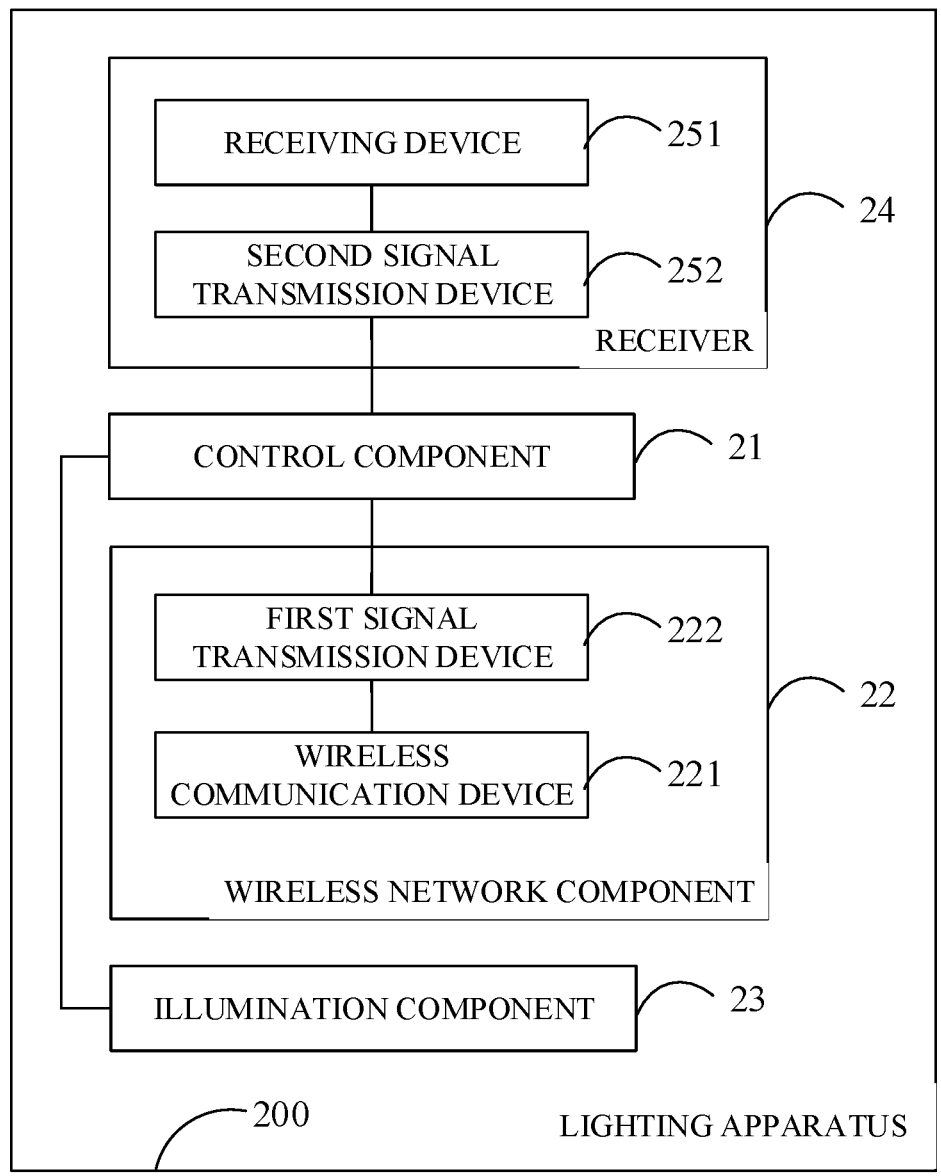

Accordingly, referring to FIG. 2C, a schematic structural diagram of another exemplary lighting apparatus is shown in accordance with some embodiments of the disclosed subject matter. As illustrated, the lighting apparatus 200 can further include a receiver 25.

The receiver can include a receiver device 251 for receiving a connection request from a terminal, and a second signal transmission device 252 for transmitting the connection request to the control component 21.

The second signal transmission device 252 is connected with the receiver device 251 and the control component 21, respectively. The connection request can include authentication request information of the terminal.

If the terminal authentication is successful, the control component 21 can allow the terminal to connect to the wireless network component 22, otherwise the control component 21 can refuse the terminal to connect to the wireless network component 22.

Figure 2D:
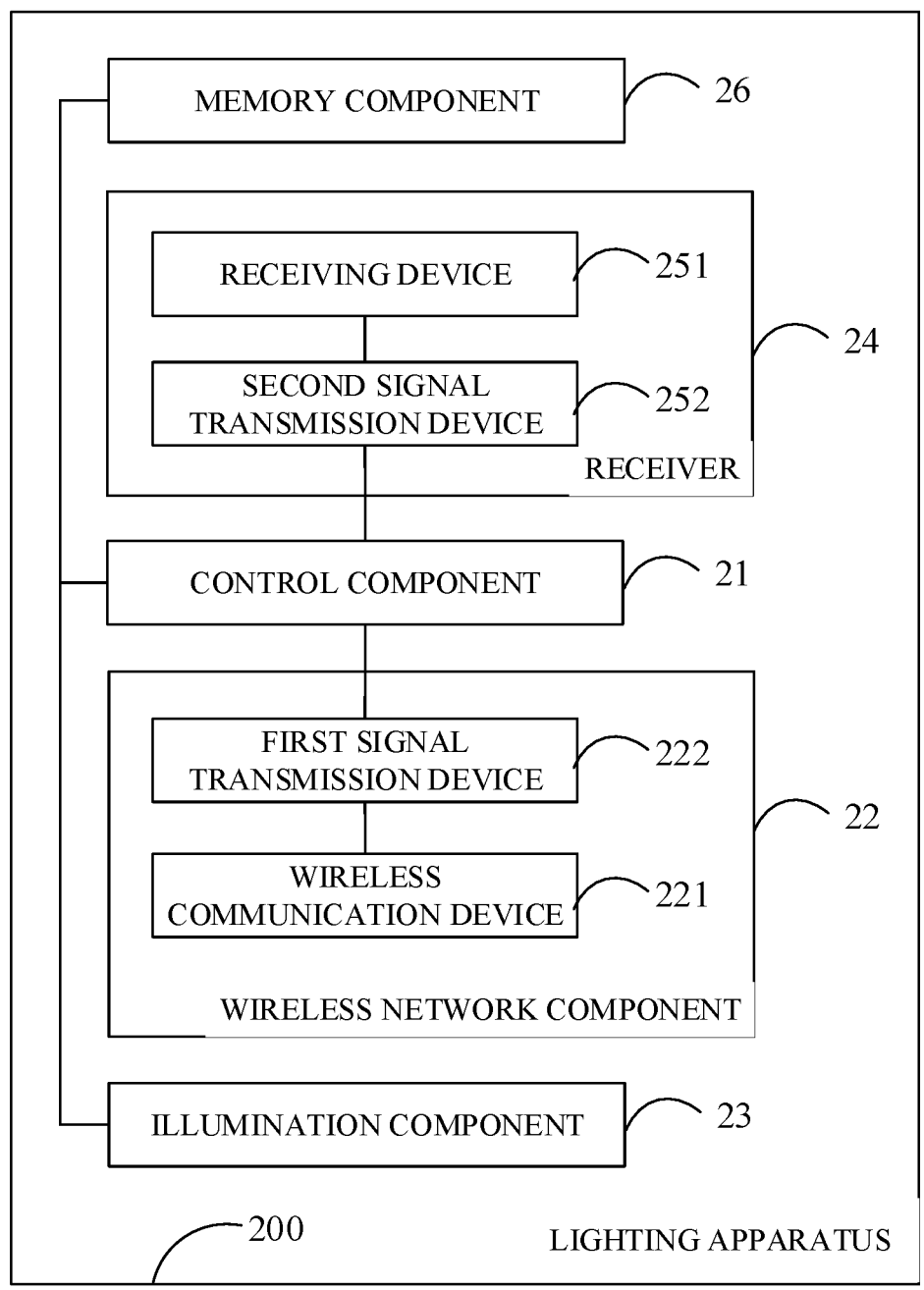

Referring to FIG. 2D, a schematic structural diagram of another exemplary lighting apparatus is shown in accordance with some embodiments of the disclosed subject matter. As illustrated, the lighting apparatus 200 can further include a memory component 26 connected with the control component 21.

The memory component 26 can store authentication information configured for the lighting apparatus 200.

In some embodiments, if the authentication request information received from the receiver 25 is consistent with the authentication information stored in the memory component 26, the terminal authentication is successful, otherwise, the terminal authentication has failed.

In some embodiments, the authentication information may be determined according to different requirements. For example, the authentication information may include an identification of the lighting apparatus 200 and a corresponding password. Specifically, a Service Set Identifier (SSID) and a password can be configured for the lighting apparatus 200, and also for the terminals that belong to relevant personnel in the workplace, or family members in the residential house. So that only the terminals that belong to relevant personnel in the workplace, or family members in the residential house can be connected to and then control the lighting apparatus 200. Therefore, the intelligence and the security of the lighting apparatus 200 can be improved.

In some embodiments, the disclosed lighting apparatus 200 includes a wireless network component 22, and can be controlled by a connection status of the wireless network component 22. When at least one user is detected within a coverage range of the lighting apparatus 200, the lighting apparatus 200 can automatically turn on without requiring any control action from the user. Therefore, the disclosed lighting apparatus 200 can not only provide a timely, reliable and easily implemented lighting control function, but also provide a wireless network signal for the users.

Figure 3A:
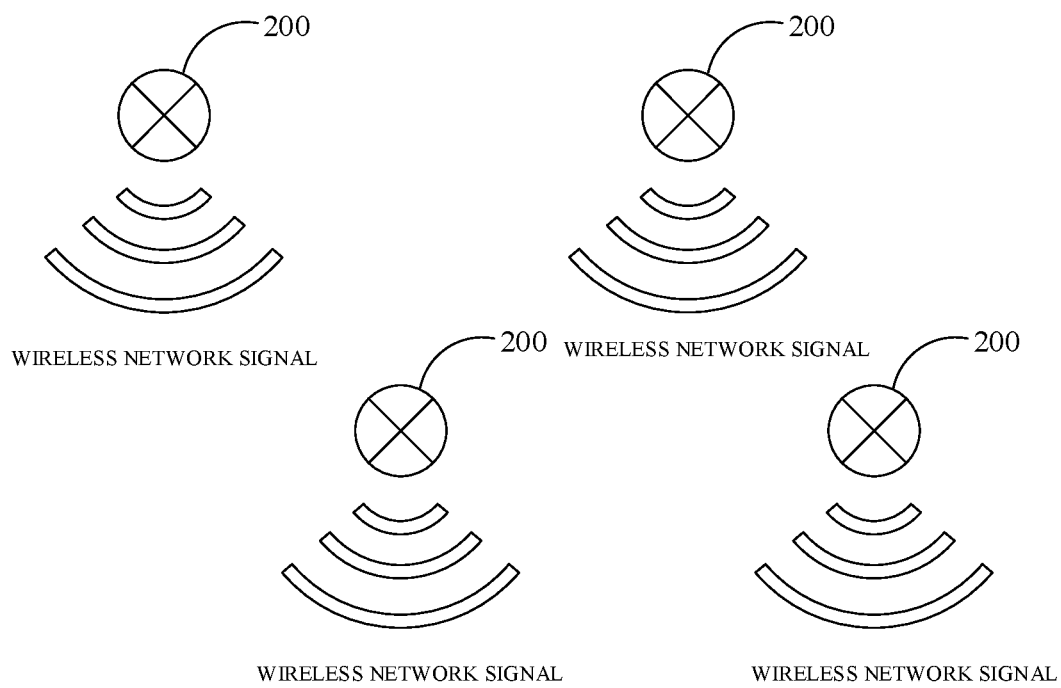
FIG. 3A is a schematic structural diagram of an exemplary lighting system in accordance with some embodiments of the disclosed subject matter.

Referring to FIG. 3A, a schematic structural diagram of an exemplary lighting system is shown in accordance with some embodiments of the disclosed subject matter. As illustrated, the lighting system can include multiple lighting apparatuses 200 described above in connection with FIGS. 2A-2D.

In some embodiments, a terminal located within the wireless network signal range of the lighting system can obtain multiple wireless network signal strengths connecting the multiple lighting apparatus 200 in the lighting system. The terminal can connected to one of the lighting apparatus of the lighting system that has the strongest wireless network signal strength.

Figure 3B:
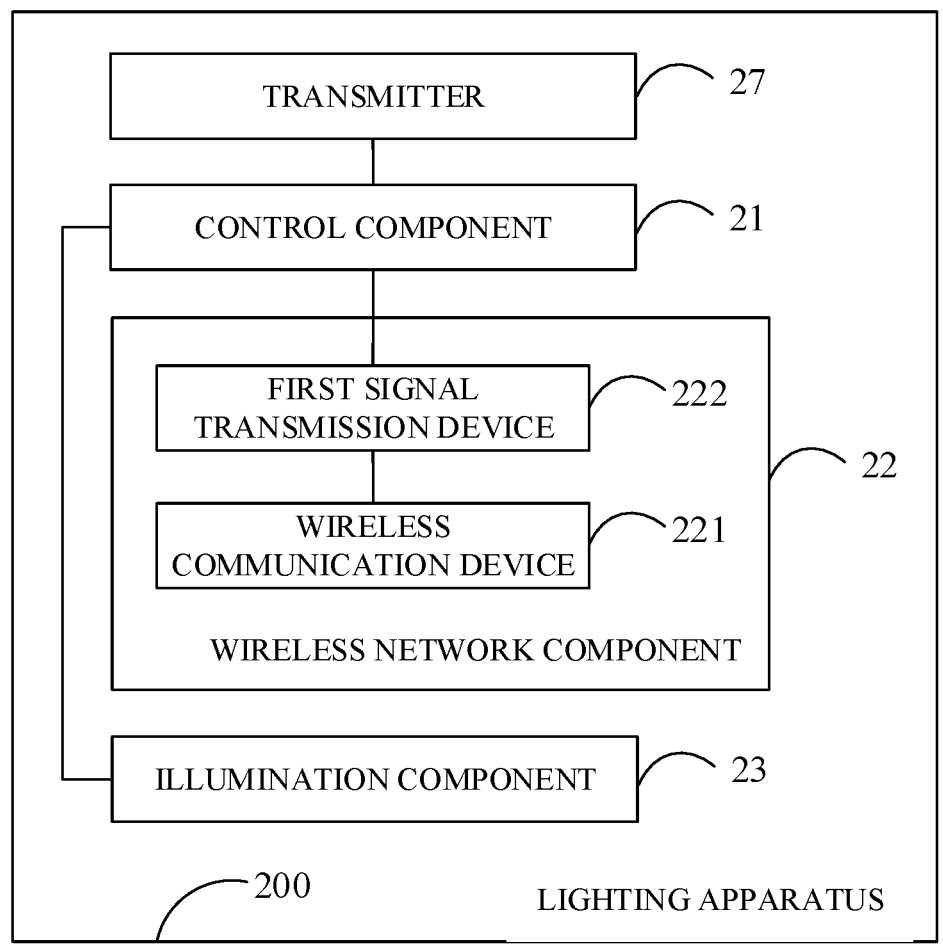
FIG. 3B is a schematic structural diagram of one exemplary lighting apparatus in the lighting system shown in FIG. 3A in accordance with some embodiments of the disclosed subject matter.

FIG. 3B is a schematic structural diagram of one exemplary lighting apparatus in the lighting system shown in FIG. 3A in accordance with some embodiments of the disclosed subject matter. As illustrated, the lighting apparatus 200 can further include a transmitter 27 configured for transmitting control instructions from the control component 21 to the terminal.

The transmitter 27 is connected with the control component 21. The control instructions can instruct the terminal to connect to the one lighting apparatus of the lighting system that has the strongest wireless network signal strength.

In some embodiments, in order to facilitate seamless switching between wireless networks, the multiple lighting apparatuses 200 may be configured with a same identifier. Specifically, the multiple network components 22 of the multiple lighting apparatus 200 in the lighting system can compose any suitable topological network such as a mesh structure network, a tree structure network, a star structure network, etc.

Figure 3C:
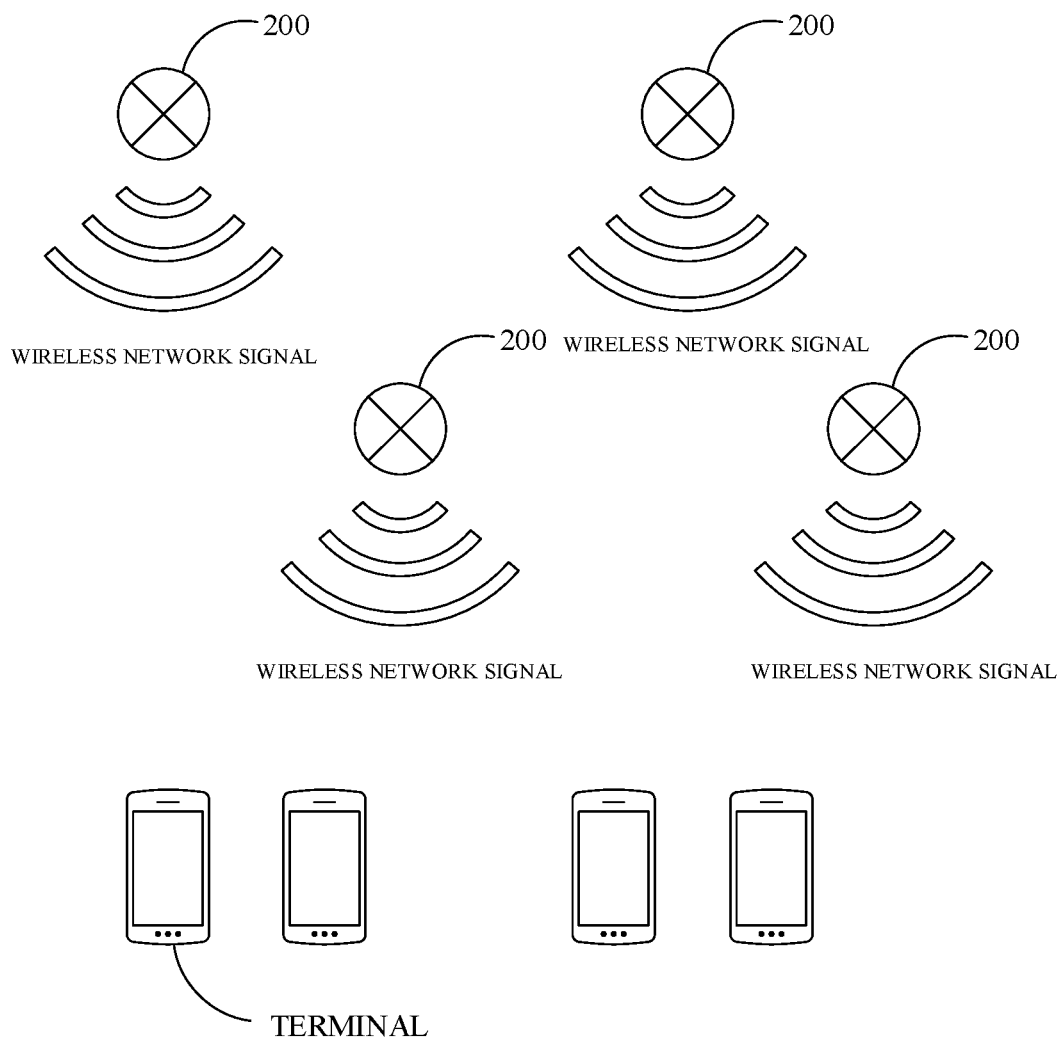
FIG. 3C is a schematic diagram of an exemplary scenario to implement the lighting system shown in FIG. 3A in accordance with some embodiments of the disclosed subject matter.

Referring to FIG. 3C, a schematic diagram of an exemplary scenario to implement the lighting system shown in FIG. 3A is shown in accordance with some embodiments of the disclosed subject matter.

As illustrated, the lighting system can include a first lighting apparatus 31, a second lighting apparatus 32, a third lighting apparatus 33, and a fourth lighting apparatus 34. Each of the four lighting apparatus can be any one of the lighting apparatus 200 described above in connection with FIGS. 2A-2D.

It should be noted that, FIG. 3C only shows one specific embodiment of the disclosed subject matter. The number of the lighting apparatus in the lighting system can be determined based on specific requirements.

The four lighting apparatus are configured with a same Service Set Identifier (SSID) and compose a wireless network. When a terminal moves from outside of the wireless network signal range of the lighting system into a wireless network signal range of the first lighting apparatus 31, the control component of the first lighting apparatus can monitor the connection status of the wireless network component of the first lighting apparatus 31.

When the terminal is connected to the wireless network component of the first lighting apparatus 31, the control component of the first lighting apparatus 31 can send a turn-on instruction to the illumination component of the first lighting apparatus 31. The illumination component of the first lighting apparatus 31 can turn on the illumination function in response to receiving the turn-on instruction from the control component.

When the terminal moves continuously, and disconnects from the wireless network component of the first lighting apparatus 31, the control component of the first lighting apparatus 31 can send a turn-off instruction to the illumination component of the first lighting apparatus 31. The illumination component of the first lighting apparatus 31 can turn off the illumination function in response to receiving the turn off instruction from the control component.

When the terminal moves continuously into a common wireless network signal range of the second lighting apparatus 32 and the third lighting apparatus 33, the terminal can obtain the wireless network signal strengths for connecting to the second lighting apparatus 32 and the third lighting apparatus 33 respectively. If the third lighting apparatus 33 has a stronger wireless network signal strength compared to the second lighting apparatus 32, the terminal can connect to the third lighting apparatus 33. And the illumination component of the third lighting apparatus 33 can be turned on.

As the terminal moves continuously, the wireless network signal strength of the third lighting apparatus 33 to the terminal gradually becomes weaker, while the wireless network signal strength of the fourth lighting apparatus 34 to the terminal gradually becomes stronger. When the wireless network signal strength of the third lighting apparatus 33 to the terminal becomes larger than the wireless network signal strength of the fourth lighting apparatus 34 to the terminal, the terminal roaming through the wireless network connection can jump from the third lighting apparatus 33 to the fourth lighting apparatus 34. That is, the terminal disconnects from the connection with the third lighting apparatus 33 and connects to the fourth lighting apparatus 34. So that the third lighting apparatus 33 turns off and the fourth lighting apparatus 34 turns on.

In some embodiments, the control component of 21 of the lighting apparatus 21 may also control other smart appliances connected to the wireless network. For example, when at least one terminal is currently connected to the wireless network, the control component 21 may turn on one or more of the illumination components and turn on or turn off other smart appliances, such as a TV or a computer, that are connected to the wireless network based on specific requirements. For example, in a conference room, when at least one terminal is currently connected to the wireless network, the control component 21 may turn on one or more of the illumination components and turn on a projector that is connected to the wireless network based on specific requirements such as a predetermined delay time. When there is no terminal connected to the wireless network, the control component 21 may turn on one or more of the illumination components and turn off that projector that is connected to the wireless network based on specific requirements.

The disclosed lighting system can provide multiple lighting apparatuses. Each lighting apparatus in the lighting system can control its illumination status based on its connection status. A terminal located in the wireless network signal range of the lighting system can automatically connect to one lighting apparatus that has the strongest wireless network signal strength. The multiple lighting apparatuses can adjust their illumination statuses based on the connection statuses. So that an automatic illumination function can be realized by the disclosed lighting system without any control action from the user. Therefore, the disclosed lighting system can not only provide a timely, reliable, and easily implemented lighting control function, but also provide a wireless network signal for the users.

The descriptions of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a lighting control method, a related lighting apparatus and system are provided.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A lighting control method, comprising:
   detecting a connection status of a wireless network component of a lighting apparatus;
   controlling a working status of an illumination component of the lighting apparatus based on the connection status;
   in response to receiving a connection request from a terminal, implementing a terminal authentication of the terminal;
   if the terminal authentication is successful, allowing the terminal to connect to the wireless network component, otherwise refusing the terminal to connect to the wireless network component;
   configuring authentication information for the lighting apparatus before implementing the terminal authentication, wherein the connection request comprises authentication request information;
   determining whether the authentication request information is consistent with the authentication information; and
   if the authentication request information is consistent with the authentication information, determining that the terminal authentication is successful, otherwise, determining that the terminal authentication has failed.

2. The lighting control method of claim 1, wherein controlling the working status of the illumination component of the lighting apparatus based on the connection status comprises:
   if the connection status indicates that at least one terminal is currently connected with the wireless network component, turning on the illumination component.

3. The lighting control method of claim 1, wherein controlling the working status of the illumination component of the lighting apparatus based on the connection status comprises:
   if the connection status indicates that at least one terminal is currently connected to the wireless network component, switching the illumination component into a bright mode.

4. The lighting control method of claim 1, wherein controlling the working status of the illumination component of the lighting apparatus based on the connection status comprises:
   if the connection status indicates that no terminal is currently connected to the wireless network component, turning off the illumination component.

5. The lighting control method of claim 4, wherein:
   turning off the illumination component comprises turning off the illumination component after a delay period.

6. The lighting control method of claim 1, wherein controlling the working status of the illumination component of the lighting apparatus based on the connection status comprises:
   if the connection status indicates that no terminal is currently connected with the wireless network component, switching the illumination component into a dim mode.

7. The lighting control method of claim 6, wherein:
   switching the illumination component into a dim mode comprises switching the illumination component into a dim mode after a delay period.

8. A lighting apparatus, comprising:
   a control component;
   a receiver including:
      a receiver device configured for receiving a connection request from a terminal, and a second signal transmission device configured for transmitting the connection request to the control component;

a wireless network component, comprising:
a wireless communication device configured for providing a wireless network signal to the terminal, and
a first signal transmission device configured for transmitting a connection status of the wireless network component to the control component; and an illumination component;

wherein the control component is configured for monitoring the connection status of the wireless network component in real time or periodically, and for controlling a working status of the illumination component based on the connection status of the wireless network component.

9. The lighting apparatus of claim 8, wherein the control component is further configured for sending a turn-on instruction to the illumination component in response to determining that the wireless network component is currently connected to the terminal.

10. The lighting apparatus of claim 8, wherein the control component is further configured for sending a turn-off instruction to the illumination component in response to determining that there is no terminal connected to the wireless network component.

11. The lighting apparatus of claim 10, further comprising:
a timer connected with the control component, wherein the timer is configured for timekeeping a delay period;
wherein the control component is further configured for starting the timer in response to determining that there is no terminal connected to the wireless network component, and sending the turn-off instruction to the illumination component in response to receiving an indication from the timer indicating that the delay period has passed.

12. The lighting apparatus of claim 8, wherein the control component is further configured for:
in response to receiving the connection request from the receiver, implementing a terminal authentication of the terminal;
if the terminal authentication is successful, allowing the terminal to connect to the wireless network component, otherwise refusing the terminal to connect to the wireless network component.

13. The lighting apparatus of claim 12, further comprising:
a memory component connected with the control component for storage authentication information configured for the lighting apparatus;
wherein:
the connection request comprises authentication request information of the terminal; and
the control component is further configured for determining whether the authentication request information is consistent with the authentication information, if the authentication request information is consistent with the authentication information, determining that the terminal authentication is successful, otherwise, determining that the terminal authentication has failed.

14. The lighting apparatus of claim 8, wherein:
the wireless network component comprises a Wi-Fi equipment; and
the illumination component comprises a LED device.

15. A lighting system, comprising a plurality of lighting apparatuses according to claim 8.

16. The lighting system of claim 15, wherein:
the plurality of lighting apparatuses have a same identifier; and
the plurality of lighting apparatuses form one of a mesh structure network, a tree structure network, or a star structure network.

17. The lighting system of claim 15, wherein each lighting apparatus comprises:
a transmitter configured for transmitting control instructions from the control component to the terminal;
wherein the transmitter is connected to the control component; and
wherein the control instructions are used for instructing the terminal to connect to one of the plurality of lighting apparatuses that has a strongest wireless network signal strength.

* * * * *